(12) United States Patent
Ye et al.

(10) Patent No.: US 12,265,166 B1
(45) Date of Patent: Apr. 1, 2025

(54) METHOD AND SYSTEM FOR ACOUSTIC INDOOR POSITIONING BASED ON CDMA

(71) Applicant: Shenzhen Cangoon Technology Co., Ltd, Shenzhen (CN)

(72) Inventors: Feng Ye, Shenzhen (CN); Jian Dai, Shenzhen (CN)

(73) Assignee: Shenzhen Cangoon Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/805,373

(22) Filed: Aug. 14, 2024

(30) Foreign Application Priority Data

Dec. 28, 2023 (CN) .......................... 202311847212.9

(51) Int. Cl.
*G01S 5/00* (2006.01)
*G01S 5/22* (2006.01)

(52) U.S. Cl.
CPC .............. *G01S 5/0081* (2013.01); *G01S 5/22* (2013.01)

(58) Field of Classification Search
None
See application file for complete search history.

(56) References Cited

U.S. PATENT DOCUMENTS

| | | | | |
|---|---|---|---|---|
| 4,965,586 A | * | 10/1990 | O'Neill | G01S 13/89 342/453 |
| 5,943,331 A | * | 8/1999 | Lavean | H04B 1/707 370/335 |
| 6,104,673 A | * | 8/2000 | Cole | G01S 7/52046 367/138 |

(Continued)

FOREIGN PATENT DOCUMENTS

| | | | | |
|---|---|---|---|---|
| CN | 115604817 A | | 1/2023 | |
| WO | WO-0134264 A1 | * | 5/2001 | .............. A63H 17/42 |

OTHER PUBLICATIONS

Title of the Item: Journal of Geomatics Science and Technology Publication Date: Apr. 15, 2020 Name of the Author: Wang Shuaishuai et al. Article Title: An Indoor Positioning Method and Implementation Based on Spread Spectrum Acoustic Wave pp. 1-5.

(Continued)

*Primary Examiner* — Isam A Alsomiri
*Assistant Examiner* — Jonathan D Armstrong
(74) *Attorney, Agent, or Firm* — George D. Morgan

(57) ABSTRACT

The invention discloses a method for acoustic indoor positioning based on CDMA, which comprises: generating a BPSK signal; The BPSK signal was detected, the collected signal was de-carrierized and low-pass filtered, and then the data was down-sampled to the design code rate, and then the coarse position of the identification code was determined by the prefix code. Finally, the data with the same length as the identification code was intercepted from the data for matching filtering through the coarse position. Four base stations were designed in each area to obtain three TDOA observations generated by four TOA information, and the terminal position could be obtained through the three TDOA observations. Different areas are distinguished by different identification codes to achieve wide area coverage. The invention provides an effective means for accurate positioning in an indoor environment.

5 Claims, 13 Drawing Sheets

| pre-buffer code | prefix code | identification code | post buffer code |
|---|---|---|---|

(56) References Cited

U.S. PATENT DOCUMENTS

| | | | | |
|---|---|---|---|---|
| 6,154,486 A | * | 11/2000 | Scott | H04W 56/003 375/E1.018 |
| 2005/0195930 A1 | * | 9/2005 | Spital | G06F 8/60 375/368 |
| 2007/0109129 A1 | * | 5/2007 | Sundstrom | G06K 7/0008 340/572.2 |
| 2015/0198702 A1 | * | 7/2015 | Kim | G01S 13/288 342/21 |
| 2019/0158339 A1 | | 5/2019 | Park et al. | |

OTHER PUBLICATIONS

Title of the Item: National Knowledge Infrastructure(CNKI) Publication Date: Mar. 1, 2015 Name of the Author: Gong Iingfeng Article Title: Simulation of BPSK and 2FSK hybrid modulation and demodulation algorithm pp. 1-80.

\* cited by examiner

| Generate the BPSK signal, After mapping the signal number, the code is upsampled to the sampling frequency of the DAC, and then the signal is passed through the shaping filter. Finally, the whole signal is multiplied by the carrier signal to offset the center frequency to the carrier frequency — S101 the BPSK signal is detected. The detection of the BPSK signal includes: After de-carrier processing, the collected signal is low-pass filtered, and then the data is down-sampled to the design code rate, and then the coarse position of the identification code is determined by the prefix code. Finally, through the coarse position, the data with the same length as the identification code is intercepted from the data for matching filtering, and the TOA of the signal is obtained — S102 four base stations are designed for each area, three TDOA observations generated by four TOA information are obtained, and the terminal position can be obtained through the three TDOA observations. Different areas are distinguished by different identification codes to achieve wide area coverage — S103

FIG. 1

| pre-buffer code | prefix code | identification code | post buffer code |

FIG. 3

METHOD AND SYSTEM FOR ACOUSTIC INDOOR POSITIONING BASED ON CDMA

CROSS-REFERENCE TO RELATED APPLICATIONS

The application claims priority to Chinese patent application No. 202311847212.9, filed on Dec. 28, 2023, the entire contents of which are incorporated herein by reference.

TECHNICAL FIELD

The present invention relates to the technical field of acoustic indoor positioning, and particularly to a method and system for acoustic indoor positioning based on CDMA.

BACKGROUND

At present, acoustic indoor positioning has become a research hotspot due to its relatively high positioning accuracy, less strict requirements for synchronization accuracy, a large number of concurrent users and other advantages, and because it can be directly implemented on COTS smart phones, or any other equipment equipped with microphones and sensors, it also brings unlimited expectations to commercial applications.

However, in practice, robust and high-precision acoustic signal detection using smartphones or other terminal devices in indoor environments through low-cost infrastructure is still a well-known challenge.

Firstly, due to room acoustic reflection and diffraction, the received sound signal is a transmitted signal consisting of multiple attenuated and delayed copies of the transmitted signal. Therefore, accurate extraction of direct path from multipath is one of the focuses of many researches. These studies include time-frequency analysis, super-resolution estimation and cross-correlation matching methods.

1) From the analysis of the fractional Fourier domain, a cleaning method is proposed to iteratively remove the multipath components and set a tight two-level threshold to screen the direct paths. Although the detection success rate is improved in high signal-to-noise ratio environment, the iterative process is too complex to calculate.
2) The super-resolution method extracts the first path in the frequency domain. The Multi-signal classification (MUSIC) based super-resolution method is used to estimate the first path, and the time-frequency analysis based method extracts the first path according to the Chirp signal frequency which linearly changes with time.
3) For the method of extracting the TOA of the first path based on the cross-correlation function between the source signal and the received signal, the arrival time of the maximum CCF peak is usually used as the reference of the direct path.

Moreover, due to the low cost devices and the Doppler effect caused by the moving target, the frequency offset of the received signal occurs, which makes the prior knowledge of the signal unreliable. The key to solving this kind of problem is to estimate the relative motion speed of the moving object. In some studies, the motion speed of pedestrians is estimated by the first estimated position of acoustic signal detection, and then the acoustic signal detection result is corrected in turn to improve the positioning result. Some studies incorporate the inertial information calculated by PDR to compensate the acoustic signal detection results and reduce the ranging error. These methods all consider to estimate the magnitude and direction of the moving object's velocity, but the accuracy of estimating the relative velocity of the moving object to the base station by this way is not high, and the correction of the frequency offset caused by Doppler is also limited.

The last step is to identify the source of the signal. Due to the limited coding ability, Chirp signals can only carry limited identifiable information, so it is difficult to distinguish the same signal template in the same spatio-temporal context. Therefore, the feasibility of repeatedly deploying the same acoustic signal anchor in the same space is greatly reduced, and both FDMA and TDMA need to be utilized. However, due to the limited bandwidth of the available frequency band, if we want to cover a large area, we must rely too much on TDMA, which will make the data update rate of the acoustic signal relatively low.

SUMMARY

Aiming at existing technology problems, the invention provides a method for acoustic indoor positioning based on CDMA.

The invention is realized as follows. A method for acoustic indoor positioning based on CDMA includes:

Step 1, generate BPSK signal, the generation of BPSK signal includes: The signal number is designed, which is composed of the pre-buffer code, the prefix code, the identification code and the post-buffer code. The identification code is randomly generated by the Gold sequence, the prefix code is a part of the tail of the copy identification code. The pre-buffer code and the post-buffer code are random values from 0 to 1 and multiplied by the window function, and the pre-buffer code and the post-buffer code are of equal length. After mapping the signal code, the code was upsampled to the sampling frequency of DAC, and then the signal was passed through the shaping filter. Finally, the whole signal was multiplied by the carrier signal to offset the center frequency to the carrier frequency.

Step 2, the BPSK signal is detected. The detection of the BPSK signal includes: After de-carrier processing, the collected signal is low-pass filtered, and then the data is down-sampled to the design code rate, and then the coarse position of the identification code is determined by the prefix code. Finally, through the coarse position, the data with the same length as the identification code is intercepted from the data for matching filtering, so as to obtain the TOA of the signal.

Step 3, four base stations are designed in each area to obtain three TDOA observations generated by the four TOA information as described in step 2, and the terminal location can be obtained through the three TDOA observations. While different areas can be distinguished by different identification codes, then wide area coverage can be easily achieved.

Further, the generation of BPSK signal described in step 1 includes:

In the first step, a unique identification code is selected and generated, which is a set of special binary sequences. In order to be easily detected in the decoding process, the identification code itself should have good autocorrelation characteristics. Moreover, in order to prevent false recognition, the identification codes should have good cross-correlation characteristics. Finally, in order to support the coverage of the base station, the number of identification codes should be enough. The Gold sequence does all three things well;

In the second step, the tail part of the identification code is copied to the front of the identification code as a prefix, which is to facilitate the identification code to be roughly located. The width of the prefix code depends on the accuracy of its own rough location.

The third step, in order to prevent the base station speaker broadcast, due to the sudden vibration or sudden stop of the low-cost diaphragm caused by frequency leakage, a harsh sound, so in the code before and after the increase of equal length buffer code; Buffer codes are designed to have random values between 0 and 1 and are multiplied by a window function; This can avoid the buffer code does not interfere with the identification code, and also make the signal slowly start, and slowly end, to avoid frequency leakage;

In the fourth step, in order to control the phase directly later, the signal number is mapped. Because $\cos(2\pi f_c t + \pi) = -\cos(2\pi f_c t)$, 0 will be mapped to $-1$, and the rest will be unchanged after mapping.

In the fifth step, the code is upsampled to the sampling frequency of the DAC.

In the sixth step, the signal is passed through the shape filter, which makes the signal have limited bandwidth and is more suitable for channel transmission. Such signal is the actual transmitted signal, denoted as x(t). Finally, the whole signal is multiplied by the carrier signal $\cos(2\pi f_c t)$, and the center frequency is offset to the carrier frequency. In this way, the original signal s(t) for base station vocalization is obtained, which is expressed as follows:

$$s(t) = Ax(t)\cos(2\pi f_c t);$$

Wherein, A is the amplitude, $f_c$ is the carrier frequency.

Further, the detection of BPSK signal described in step 2 includes:

In the first step, signal preprocessing.

After the acoustic signal propagates through the air, after time τ, the microphone of the terminal collects the broadcast signal. It can be considered that the collected signal has gone through channel attenuation and is doped with environmental noise, which is denoted as:

$$R(t+\tau) = Hs(t) + n(t+\tau)$$
$$= AHx(t)\cos(2\pi f_c t) + n(t+\tau);$$

The collected signal is multiplied by the carrier signal. This process is called de-carrier, denoted as:

$$R(t+\tau)\cos(2\pi f_c t) = AHx(t)\cos^2(2\pi f_c t) + n(t+\tau)\cos(2\pi f_c t)$$
$$= \frac{1}{2}AHx(t) + \frac{1}{2}AHx(t)\cos(4\pi f_c t) + n(t+\tau)\cos(2\pi f_c t);$$

In this way, the part of the signal transmitted by the speaker can be decomposed from the received signal, and then the result is filtered by low-pass filter to remove the irrelevant high-frequency information in the signal, so that the noise in the environment and the interference of other signals can be effectively suppressed to obtain the cleaner x(t), which is denoted as:

$$LPF[R(t+\tau)\cos(2\pi f_c t)] = \frac{1}{2}AHx(t);$$

The data is then downsampled to compress the signal from the sampling frequency to the design-time code rate.

In the second step, TOA is confirmed upon arrival.

Because the prefix code is the tail of the identification code, the position of the prefix code is roughly found by a simple front-back matching in the time domain, so as to determine the coarse position of the identification code.

Through the coarse position, the data with the same length as the identification code is intercepted from the data for matched filtering. However, due to the Doppler effect caused by low-cost devices and moving targets, the collected carrier frequency will be offset, that is, the carrier signal selected in the carrier removal process is not accurate, so the frequency offset is processed before the matched filtering.

Firstly, the intercepted signal is Fourier transformed, and then the signal is converted from the time domain to the frequency domain. At this time, the frequency point where the strength of the frequency domain maximum value is located can be regarded as the frequency offset of the signal, but because the frequency resolution is not high, the surrounding frequency points centered at the frequency will be used as the candidate frequency offset. These alternative frequency offsets are de-carriered with the intercepted signal by enumerating, and then matched with the template of the identification code, so the TOA of the signal can be easily confirmed.

Another purpose of the present invention is to provide a signal generation system for acoustic indoor positioning based on the above method, including:

A signal generator, which is used to generate the BPSK signal, including design pre-buffer code, prefix code, identification code and post-buffer code.

A mapping unit, which is used to map and upsample the signal code to the DAC sampling frequency.

A filter, which is used to process the signal through the shaping filter so that the signal has a limited bandwidth;

A carrier modulator, which is used to shift the center frequency of the signal to the carrier frequency.

Another purpose of the present invention is to provide a signal detection system for acoustic indoor positioning based on the above method, which comprises:

A de-carrier processing unit, which is used to de-carrier the acquired signal;

A low-pass filter, which is used to low-pass filter the signal after carrier removal.

A sampling rate adjustment unit, which is to downsample the data to the design-time code rate.

A matched filter, which is used to perform matched filtering, thus determining the arrival TOA of the signal.

Another purpose of the present invention is to provide a positioning system for acoustic indoor positioning based on the above method, including:

Multiple base stations, each area has four base stations designed to transmit BPSK signals after specific processing;

A TOA information processing unit, which is for obtaining TOA information from the received signal;

A TDOA calculation unit, which is for generating TDOA observations based on the collected TOA information;

A location calculation unit, which is for calculating the location of the terminal from the TDOA observations.

Another purpose of the present invention is to provide an area discrimination system for acoustic indoor positioning based on the above method, comprising:

An identification code generating unit, which is used to generate the identification code randomly generated by the Gold sequence.

A prefix code generation unit, which is used to copy a part of the tail of the identification code to the front of the identification code as a prefix;

A buffer code generating unit, which is used to generate the pre-buffer code and post-buffer code of the random value from 0 to 1 multiplied by the window function.

A region identification unit, which is used to distinguish regions by different identification codes to achieve wide area coverage.

Combined with the above technical scheme and the technical problems solved, the advantages and positive effects of the technical scheme to be protected by the invention are as follows:

Through the coarse position, the data with the same length of identification code can be intercepted from the data for matched filtering; It is guaranteed that the intercepted data must contain the identification code, and because gcc is a convolution operation, the prefix will also enhance the similarity strength of the identification code. However, before matched filtering, the frequency offset is processed. As previously analyzed, due to the equipment and Doppler response, the collected carrier frequency will be offset, that is, the carrier signal selected by the de-carrier process is not accurate. Fourier transform is performed on the intercepted signal to convert the signal from the time domain to the frequency domain. At this time, the frequency point where the strength of the frequency domain maximum value is located can be regarded as the frequency offset of the signal. These alternative frequency offsets are de-carriered with the intercepted signal by enumerating, and then matched with the template of the identification code, the arrival time of the signal can be easily confirmed.

BRIEF DESCRIPTION OF DRAWINGS

In order to more clearly state the technical scheme of the embodiment of the invention, the following is a brief introduction of the drawings required to be used in the embodiment of the invention. It is obvious that the drawings described below are only some embodiments of the invention, and other drawings can be obtained according to these drawings without creative labor for ordinary technicians in the field.

FIG. 1 is the flow chart of the method for acoustic indoor positioning based on CDMA provided by the embodiment of the invention.

FIG. 3 is a schematic diagram of the composition of the BPSK signal number provided by the embodiment of the invention.

DETAILED DESCRIPTION OF THE EMBODIMENTS

Figure 2:
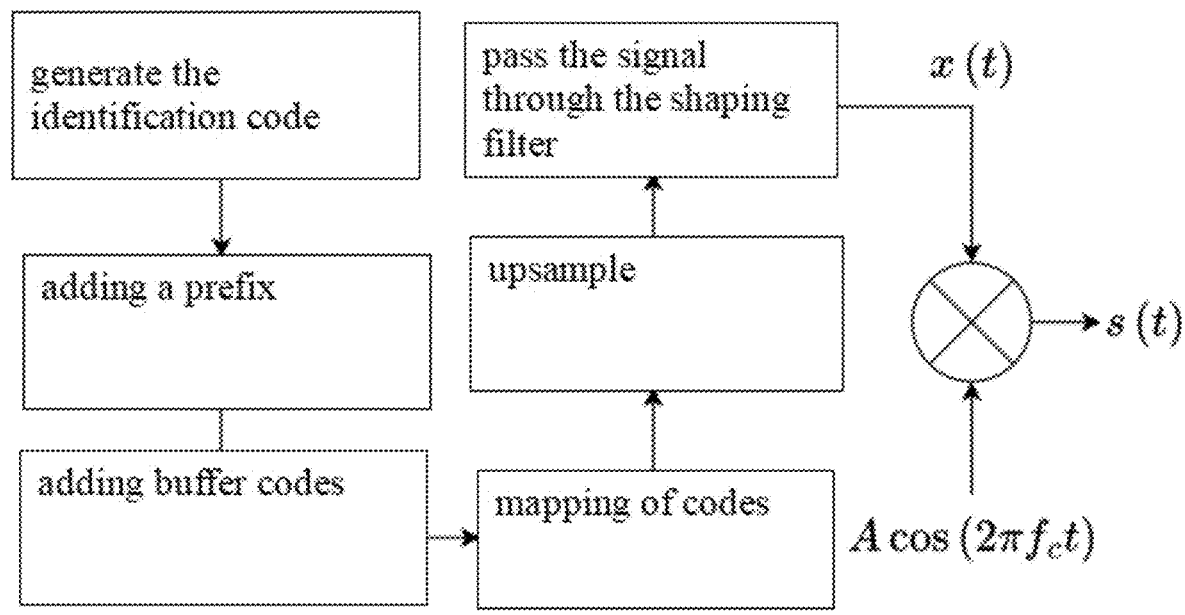
FIG. 2 is the schematic diagram of generating BPSK signal provided by the embodiment of the invention.
Figure 4:
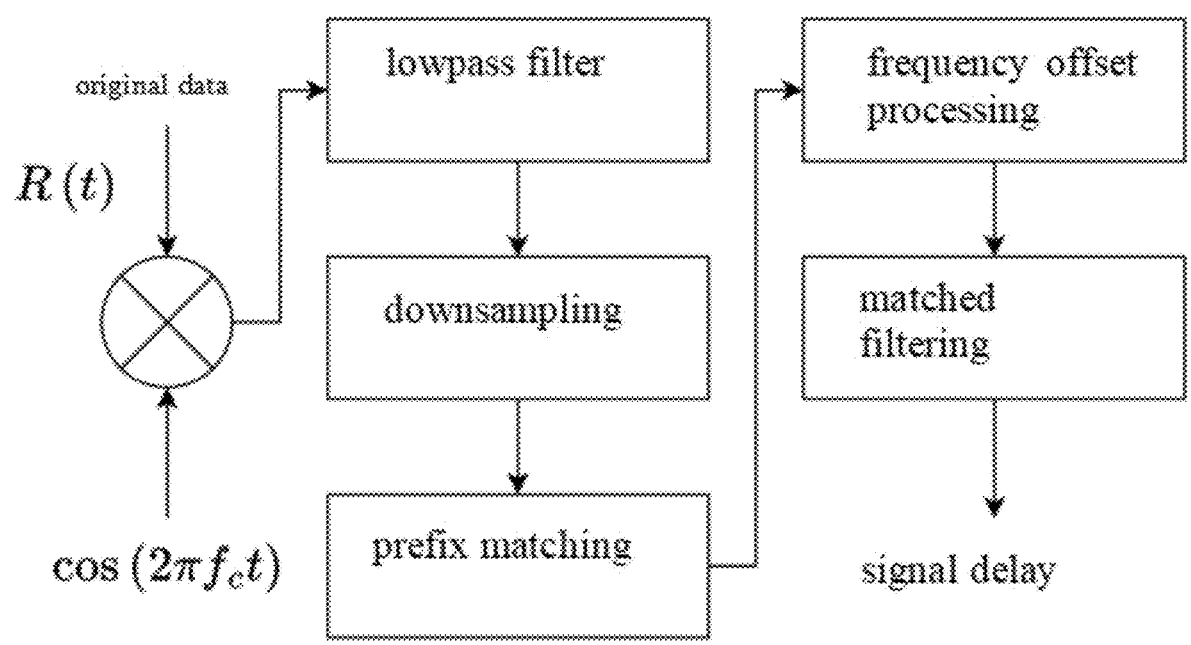
FIG. 4 is the schematic diagram of BPSK signal detection provided by the embodiment of the invention.

In order to make the purpose, technical scheme and advantages of the invention more clearly, the invention is further explained in detail in the following combination with an embodiment. It should be understood that the specific embodiments described herein are intended only to explain the invention and are not intended to qualify it.

The invention provides a method for acoustic indoor positioning based on CDMA. It includes:

Step 1, generate BPSK signal, the generation of BPSK signal includes: The signal number is designed, which is composed of the pre-buffer code, the prefix code, the identification code and the post-buffer code. The identification code is randomly generated by the Gold sequence, the prefix code is a part of the tail of the copy identification code. The pre-buffer code and the post-buffer code are random values from 0 to 1 and multiplied by the window function, and the pre-buffer code and the post-buffer code are of equal length. After mapping the signal code, the code was upsampled to the sampling frequency of DAC, and then the signal was passed through the shaping filter. Finally, the whole signal was multiplied by the carrier signal to offset the center frequency to the carrier frequency.

Step 2, the BPSK signal is detected. The detection of the BPSK signal includes: After de-carrier processing, the collected signal is low-pass filtered, and then the data is down-sampled to the design code rate, and then the coarse position of the identification code is determined by the prefix code. Finally, through the coarse position, the data with the same length as the identification code is intercepted from the data for matching filtering, so as to obtain the TOA of the signal.

Step 3, four base stations are designed in each area to obtain three TDOA observations generated by the four TOA information as described in step 2, and the terminal location can be obtained through the three TDOA observations. While different areas can be distinguished by different identification codes, then wide area coverage can be easily achieved.

Further, the generation of BPSK signal described in step 1 includes:

In the first step, a unique identification code is selected and generated, which is a set of special binary sequences. In order to be easily detected in the decoding process, the identification code itself should have good autocorrelation characteristics. Moreover, in order to prevent false recognition, the identification codes should have good cross-correlation characteristics. Finally, in order to support the coverage of the base station, the number of identification codes should be enough. The Gold sequence does all three things well;

In the second step, the tail part of the identification code is copied to the front of the identification code as a prefix, which is to facilitate the identification code to be roughly located. The width of the prefix code depends on the accuracy of its own rough location.

The third step, in order to prevent the base station speaker broadcast, due to the sudden vibration or sudden stop of the low-cost diaphragm caused by frequency leakage, a harsh sound, so in the code before and after the increase of equal length buffer code; Buffer codes are designed to have random values between 0 and 1 and are multiplied by a window function; This can avoid the buffer code does not interfere with the identification code, and also make the signal slowly start, and slowly end, to avoid frequency leakage;

In the fourth step, in order to control the phase directly later, the signal number is mapped. Because $\cos(2\pi f_c t+\pi)$ $=-\cos(2\pi f_c t)$, 0 will be mapped to $-1$, and the rest will be unchanged after mapping.

In the fifth step, the code is upsampled to the sampling frequency of the DAC.

In the sixth step, the signal is passed through the shape filter, which makes the signal have limited bandwidth and is more suitable for channel transmission. Such signal is the actual transmitted signal, denoted as x(t). Finally, the whole signal is multiplied by the carrier signal $\cos(2\pi f_c t)$, and the center frequency is offset to the carrier frequency. In this way, the original signal s(t) for base station vocalization is obtained, which is expressed as follows:

$$s(t)=Ax(t)\cos(2\pi f_c t);$$

Wherein, A is the amplitude, $f_c$ is the carrier frequency.

Further, the detection of BPSK signal described in step 2 includes:

In the first step, signal preprocessing.

After the acoustic signal propagates through the air, after time T, the microphone of the terminal collects the broadcast signal. It can be considered that the collected signal has gone through channel attenuation and is doped with environmental noise, which is denoted as:

$$R(t+\tau) = Hs(t) + n(t+\tau)$$
$$= AHx(t)\cos(2\pi f_c t) + n(t+\tau);$$

The collected signal is multiplied by the carrier signal. This process is called de-carrier, denoted as:

$$R(t+\tau)\cos(2\pi f_c t) = AHx(t)\cos^2(2\pi f_c t) + n(t+\tau)\cos(2\pi f_c t)$$
$$= \frac{1}{2}AHx(t) + \frac{1}{2}AHx(t)\cos(4\pi f_c t) + n(t+\tau)\cos(2\pi f_c t);$$

In this way, the part of the signal transmitted by the speaker can be decomposed from the received signal, and then the result is filtered by low-pass filter to remove the irrelevant high-frequency information in the signal, so that the noise in the environment and the interference of other signals can be effectively suppressed to obtain the cleaner x(t), which is denoted as:

$$LPF[R(t+\tau)\cos(2\pi f_c t)] = \frac{1}{2}AHx(t);$$

The data is then downsampled to compress the signal from the sampling frequency to the design-time code rate.

In the second step, TOA is confirmed upon arrival.

Because the prefix code is the tail of the identification code, the position of the prefix code is roughly found by a simple front-back matching in the time domain, so as to determine the coarse position of the identification code.

Through the coarse position, the data with the same length as the identification code is intercepted from the data for matched filtering. However, due to the Doppler effect caused by low-cost devices and moving targets, the collected carrier frequency will be offset, that is, the carrier signal selected in the carrier removal process is not accurate, so the frequency offset is processed before the matched filtering.

Firstly, the intercepted signal is Fourier transformed, and then the signal is converted from the time domain to the frequency domain. At this time, the frequency point where the strength of the frequency domain maximum value is located can be regarded as the frequency offset of the signal, but because the frequency resolution is not high, the surrounding frequency points centered at the frequency will be used as the candidate frequency offset. These alternative frequency offsets are de-carriered with the intercepted signal by enumerating, and then matched with the template of the identification code, so the TOA of the signal can be easily confirmed.

Another purpose of the present invention is to provide a signal generation system for acoustic indoor positioning based on the above method, including:

A signal generator, which is used to generate the BPSK signal, including design pre-buffer code, prefix code, identification code and post-buffer code.

A mapping unit, which is used to map and upsample the signal code to the DAC sampling frequency.

A filter, which is used to process the signal through the shaping filter so that the signal has a limited bandwidth;

A carrier modulator, which is used to shift the center frequency of the signal to the carrier frequency.

Another purpose of the present invention is to provide a signal detection system for acoustic indoor positioning based on the above method, which comprises:

A de-carrier processing unit, which is used to de-carrier the acquired signal;

A low-pass filter, which is used to low-pass filter the signal after carrier removal.

A sampling rate adjustment unit, which is to downsample the data to the design-time code rate.

A matched filter, which is used to perform matched filtering, thus determining the arrival TOA of the signal.

Another purpose of the present invention is to provide a positioning system for acoustic indoor positioning based on the above method, including:

Multiple base stations, each area has four base stations designed to transmit BPSK signals after specific processing;

A TOA information processing unit, which is for obtaining TOA information from the received signal;

A TDOA calculation unit, which is for generating TDOA observations based on the collected TOA information;

A location calculation unit, which is for calculating the location of the terminal from the TDOA observations.

Another purpose of the present invention is to provide an area discrimination system for acoustic indoor positioning based on the above method, comprising:

An identification code generating unit, which is used to generate the identification code randomly generated by the Gold sequence.

A prefix code generation unit, which is used to copy a part of the tail of the identification code to the front of the identification code as a prefix;

A buffer code generating unit, which is used to generate the pre-buffer code and post-buffer code of the random value from 0 to 1 multiplied by the window function.

A region identification unit, which is used to distinguish regions by different identification codes to achieve wide area coverage.

Embodiment: Shown in FIG. 1~FIG. 9c

I. Localization System with Wide Area Coverage.

Example I: Localization System with Wide Area Coverage

A. Generation of Signal Identification Code.
1) Identification code selection: In the wide area coverage system, a set of Gold sequences is first selected as the unique identification code. These sequences have excellent performance in terms of autocorrelation and cross-correlation and are suitable for discriminating between different base stations.
2) Sequence processing: each base station is assigned a unique Gold sequence as an identification code. These identification codes are not only used to distinguish different base stations, but also different broadcast areas.
3) Sequence expansion: a part of each identifier is copied to its front as the prefix code to realize the coarse location of the identifier. The length of the prefix code is determined according to the requirement of positioning accuracy.

B. Acoustic Signal Transmission Scheme Based on CDMA.
1) Signal mapping and upsampling: The selected identification code is mapped, where 0 is mapped to −1 and 1 remains unchanged. Then, the mapped code is upsampled to the sampling frequency of the DAC.
2) Signal processing: the upsampled signal is processed by the shaping filter to make it have limited bandwidth and adapt to the transmission requirements of the channel.
3) Signal modulation: The processed signal is multiplied by the carrier signal and the center frequency is offset to the carrier frequency to generate the final acoustic signal for broadcasting at the base station.
4) Broadcast and detection: speakers are used at each base station to broadcast the processed acoustic signal. At the receiver, the signal is detected by a specific receiving mechanism to obtain the TOA information, and then the location of the device is calculated.

Embodiment 2: Multi-Area Coverage Positioning System

A. Generation of Multi-Area Identification Codes.
1) Region coding: For each positioning region, a unique Gold sequence is assigned as the region identification code. These codes provide the necessary differentiation between multiple regions.
2) Code optimization: the length and complexity of each area identification code are adjusted to suit the specific coverage and positioning requirements of the area.

B. Multi-Area Propagation of Positioning Signals.
1) Signal design: Design specific acoustic signals for each positioning area, taking into account the size of the area and environmental characteristics such as building layout and sound propagation characteristics.
2) Signal propagation: a different base station is used in each region to broadcast the corresponding acoustic signal. These signals contain information for distinguishing between different regions and for precise localization.
3) Receiving and processing: advanced signal processing algorithms are used in the receiving device to accurately capture acoustic signals from different regions, and accordingly calculate the exact location of the device.

2. Experimental Verification and Discussion.

A. Static Ranging Performance Comparison.

Four loudspeakers are placed at one end of the corridor and chirp signals are first broadcast, two of which are transformed from high frequency to low frequency and two from low frequency to high frequency, considering that there is interference between different signals. Then, terminals were placed at 5 meters, 10 meters, 15 meters, and 20 meters from the loudspeaker for signal acquisition, and each location was collected for 2 minutes. After the chirp signal is collected, the BPSK signal is broadcast and the experiment is repeated.

Figure 5:
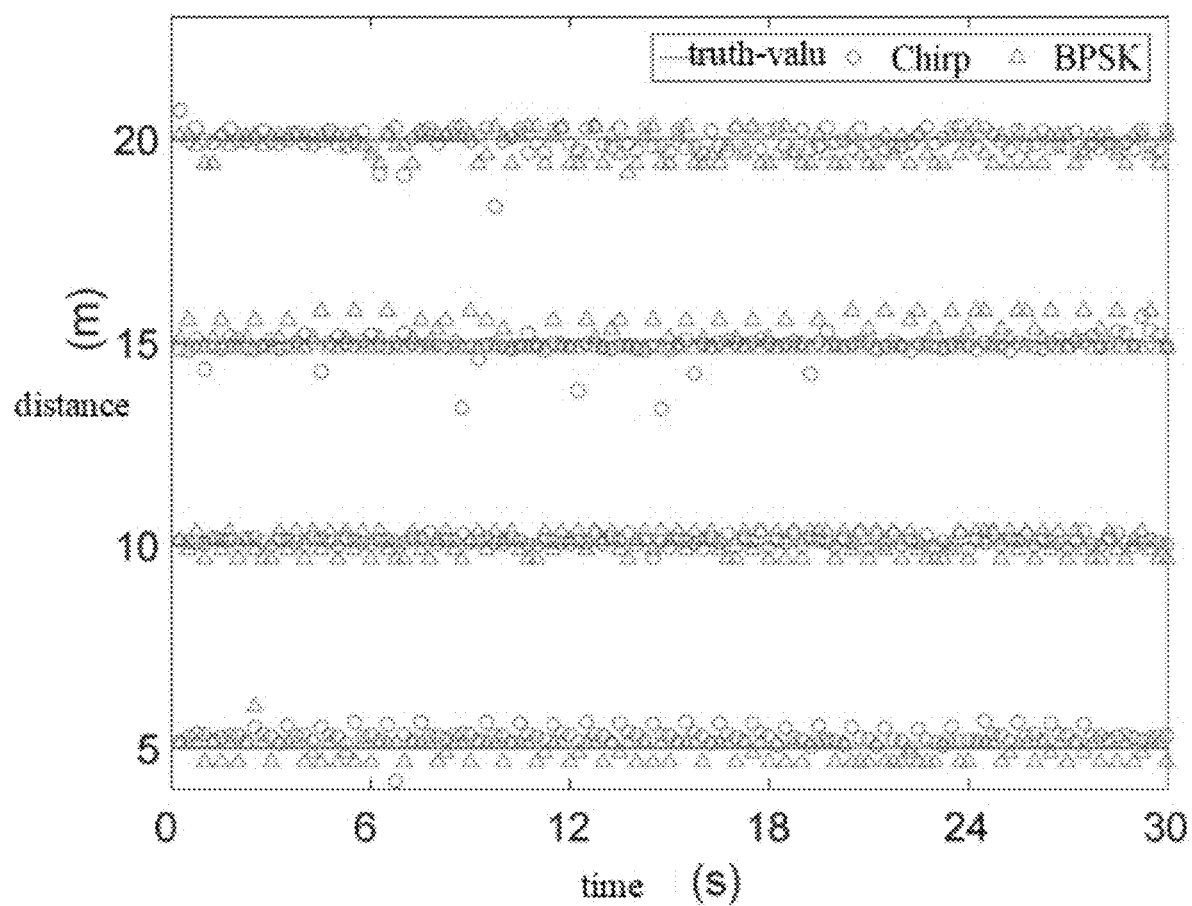
FIG. 5 shows the distance estimation results of the Chirp signal and the BPSK signal at different positions provided by the embodiment of the invention.

The range estimation results of the two signals at different locations are shown in FIG. 5. Wherein, the straight line represents the true value, the circle represents the chirp signal ranging result, and the triangle represents the BPSK ranging result. The corresponding error statistical results are shown in Table 1. It can be found that the ranging accuracy of BPSK and chirp signals is equivalent, both reaching the sub-meter level, and the average ranging accuracy is 0.27 m and 0.15 m, respectively. At the same time, in the case of long ranging time, the results of BPSK are more stable, while chirp signal has obvious outliers.

TABLE 1

Error statistics of different localization algorithms

| | | distance from the speaker(m) | | | |
| --- | --- | --- | --- | --- | --- |
| signal | error | 5 | 10 | 15 | 20 |
| Chirp | mean deviation(m) | 0.167 | 0.123 | 0.144 | 0.185 |
| | standard deviation(m) | 0.159 | 0.105 | 0.281 | 0.223 |
| BPSK | mean deviation(m) | 0.222 | 0.280 | 0.282 | 0.292 |
| | standard deviation(m) | 0.149 | 0.106 | 0.248 | 0.222 |

B. Dynamic Ranging Performance Comparison.

Figure 6:
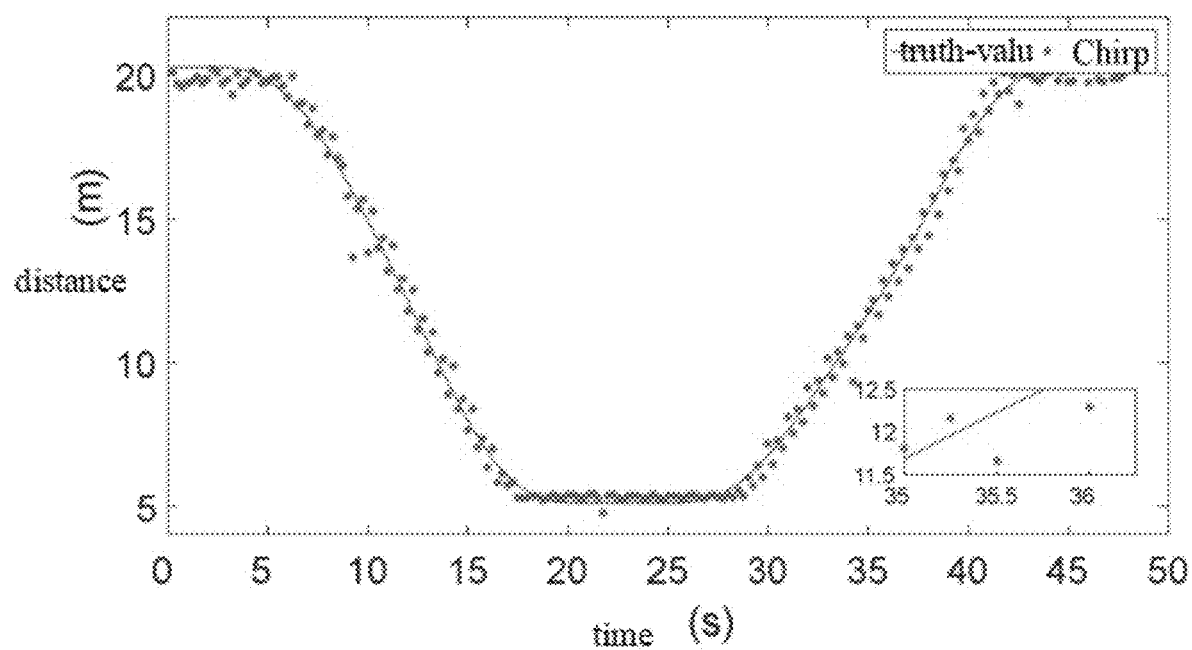
FIG. 6 is the ranging accuracy of the Chirp signal in the process of dynamic walking provided by the embodiment of the invention.
Figure 7:
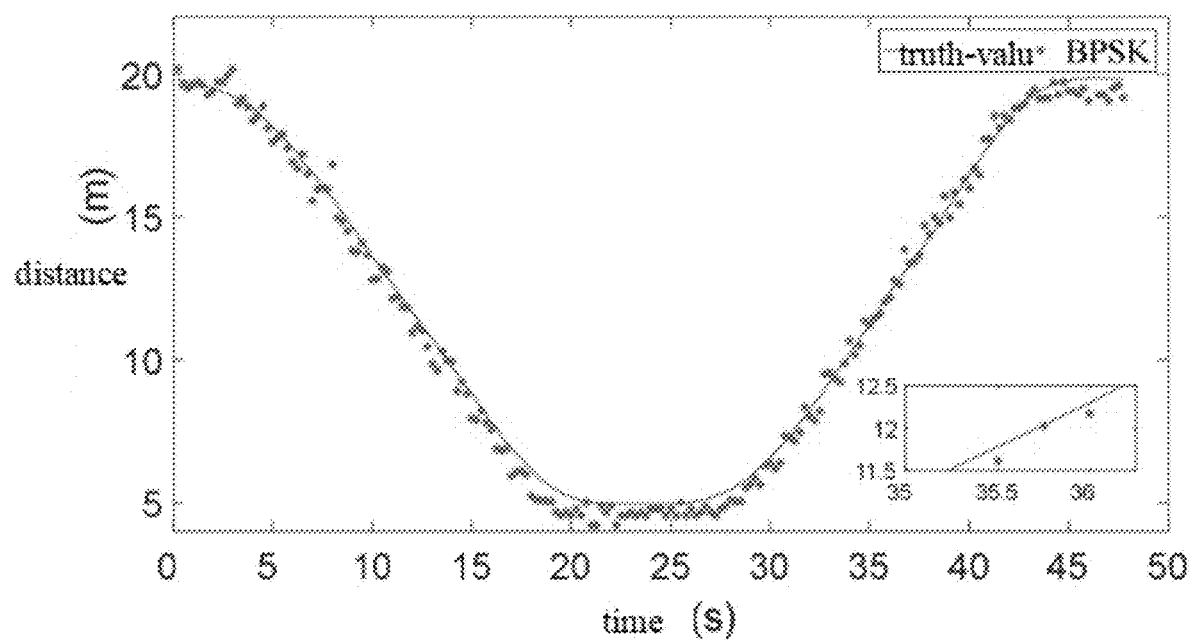
FIG. 7 is the ranging accuracy of the BPSK signal in the process of dynamic walking provided by the embodiment of the invention.

In order to verify the ranging accuracy of the two signals during dynamic walking, the tester carried the smartphone to walk from 20 m to 5 m from the speaker, and then back to 20 m from 5 m, stayed at both ends for a period of time, and walked along the trajectory for four cycles, and the ranging results are shown in FIG. 6 and FIG. 7. Since there are two kinds of chirp signals, high frequency to low frequency and low frequency to high frequency, which are affected by Doppler effect during movement, the ranging results are distributed on both sides of the true value. The accuracy of the distance measurement at both ends of the stay is significantly higher than the accuracy of the middle walking part. However, the ranging effect of BPSK does not change significantly between the staying phase and the walking phase. The ranging accuracy statistics of the two signals when they are dynamic are shown in Table 2. Due to the influence of Doppler frequency offset, the dynamic average ranging accuracy of chirp signal is 0.40 m, which is 166% lower than the static accuracy. The dynamic average ranging accuracy of BPSK signal is 0.31 m, which is only 14.8% lower than the static accuracy. It can be seen that the BPSK signal has a stronger ability to resist the Doppler effect.

TABLE 2

Error statistics of different localization algorithms

| signal | error | period | | | |
|---|---|---|---|---|---|
| | | 1 | 2 | 3 | 4 |
| Chirp | mean deviation(m) | 0.403 | 0.400 | 0.385 | 0.416 |
| | standard deviation(m) | 0.271 | 0.313 | 0.295 | 0.256 |
| BPSK | mean deviation(m) | 0.287 | 0.263 | 0.352 | 0.349 |
| | standard deviation(m) | 0.292 | 0.229 | 0.272 | 0.300 |

C. Dynamic Positioning Performance Comparison.

Figure 8A:
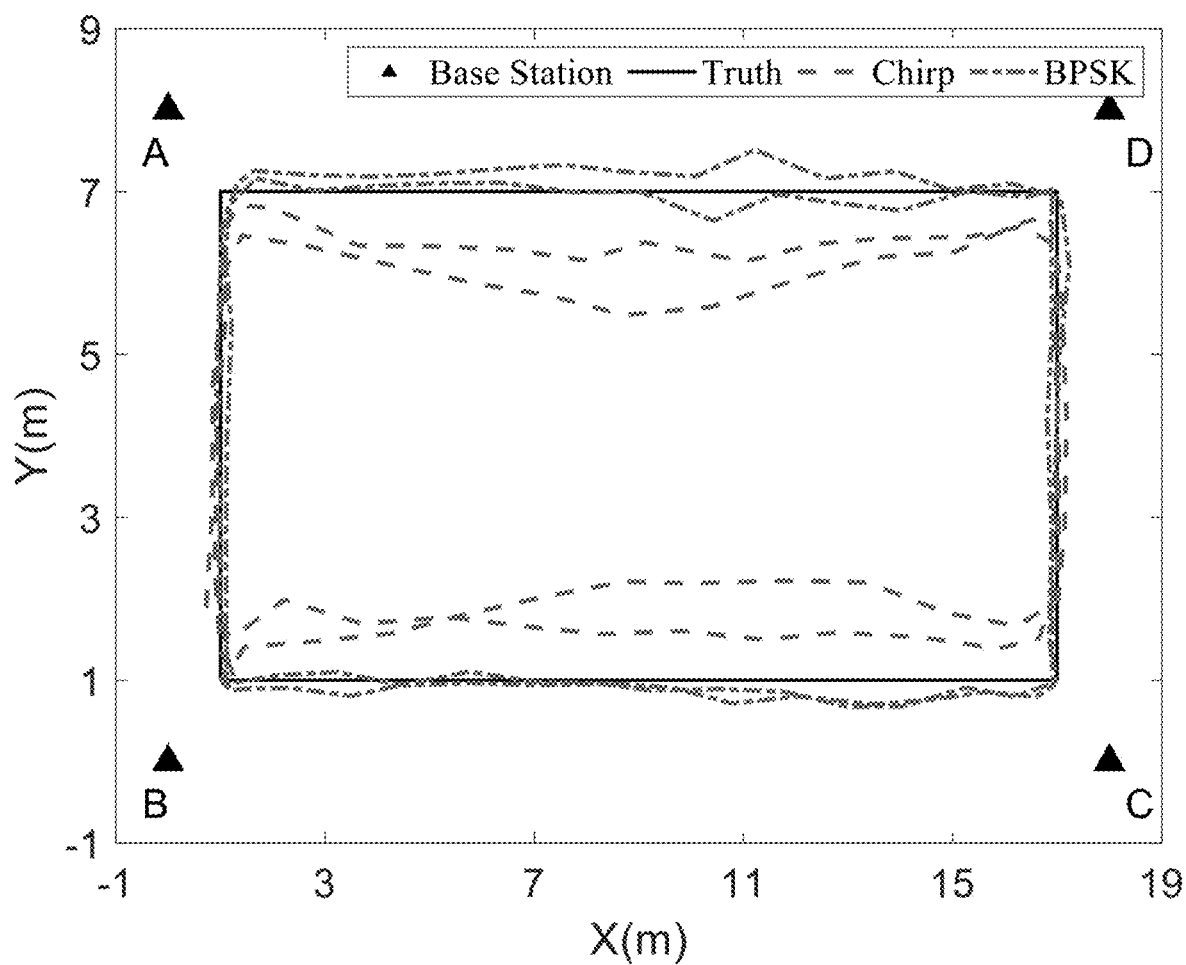
FIG. 8a, FIG. 8b and FIG. 8c show the three positioning trajectories of Chirp signal and BPSK signal provided by the embodiment of the invention.
Figure 8B:
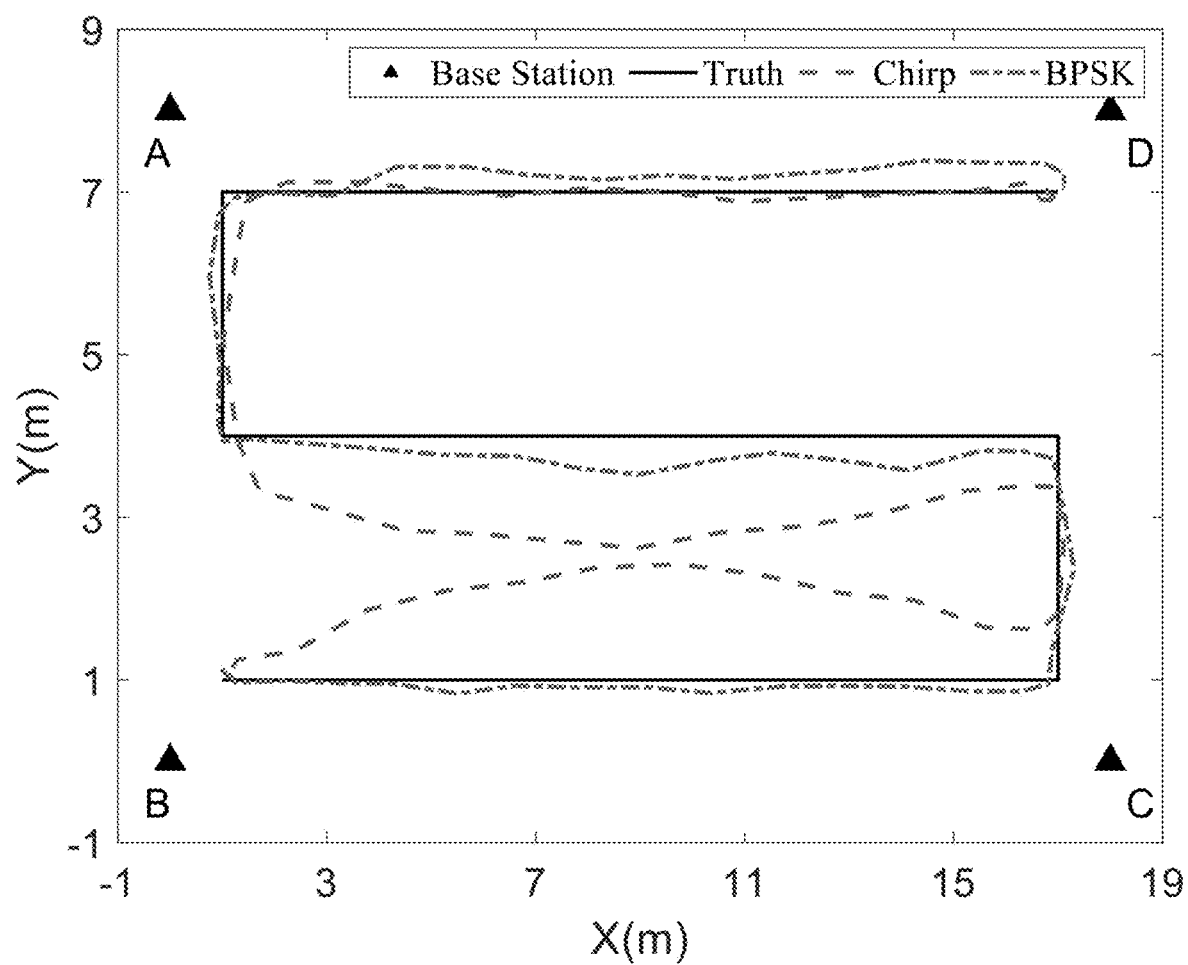
Figure 8C:
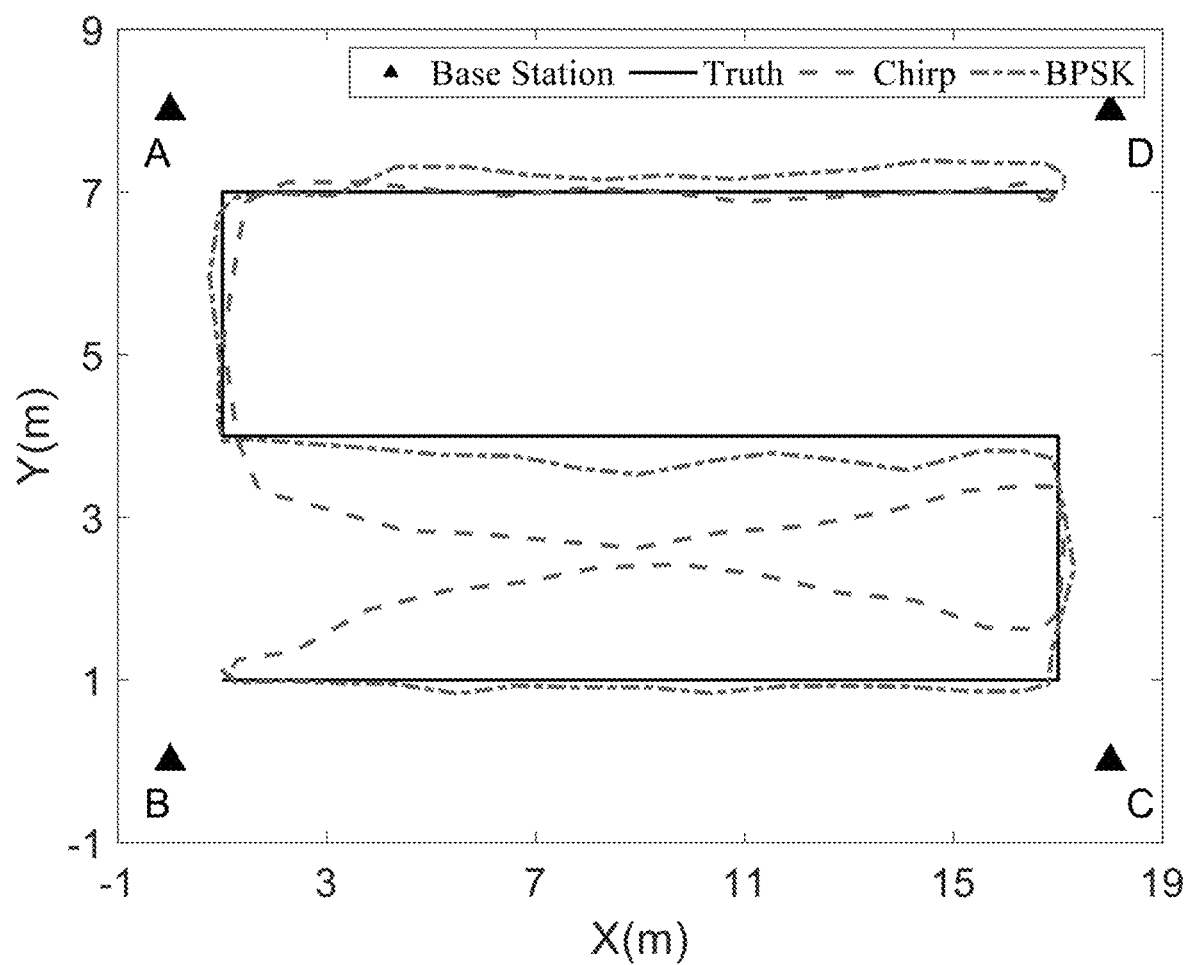

In order to verify the positioning effect of chirp signal and BPSK signal, the experimental scene is selected in an empty room, the size of the room is 18 m×8 m, and speakers are placed in the four corners of the room. A rectangular coordinate system is established with speaker B in the lower left corner as the origin, and the coordinates of the other three speakers are A (0,8), C (18,0), D (8,18), three tracks are set in the positioning area, and the sequence of speakers passing through is B-C-D-A, B-C-A-D, B-A-C-D. The tester carries the smartphone to walk along the three tracks respectively, and the positioning results are shown in FIG. 8a, FIG. 8b and FIG. 8c. The triangle represents the speaker, and the line is the true value of the track. The dashed and dotted lines represent the localization results of BPSK signals for chirp signals, respectively.

When the loudspeaker broadcasts chirp signals, A and C broadcast signals from high frequency to low frequency, and B and D broadcast signals from low frequency to high frequency. The ranging changes caused by the Doppler effect of chirp signals are as follows:

TABLE 3

Error statistics of different localization algorithms

| | frequency change | |
|---|---|---|
| Motion trails | High frequency → low frequency | Low frequency → high frequency |
| close | The ranging becomes longer | The ranging becomes shorter |
| away | The ranging becomes shorter | The ranging becomes longer |

When the tester moves from B to C, the distance from the chirp signal measurement base station to the device becomes longer when it is far away from speaker B, and the distance becomes longer when it is close to speaker C. At the same time, the distance becomes shorter when it is far away from speaker A and close to speaker D, so it can be seen from FIG. 8a and FIG. 8b that the motion trajectory from B to C is obviously convex. Similarly, when the tester moves from D to A, the distance between speaker A and speaker D becomes longer, and the distance between speaker B and speaker C becomes shorter. Therefore, the trajectory is obviously concave. However, in FIG. 8b, when the tester moves from A to D, away from speaker A and close to speaker D, the trajectory becomes shorter. Although the ranging of B and C becomes longer, no obvious error is caused under the limit of A and D due to the long distance. It can be seen that when using chirp signal localization, the range error caused by Doppler frequency shift is closely related to the direction of target velocity, even if the walking trajectory is the same, clockwise walking and anticlockwise walking will lead to different experimental results. In contrast, BPSK achieves significantly better localization results than chirp signals.

Figure 9A:
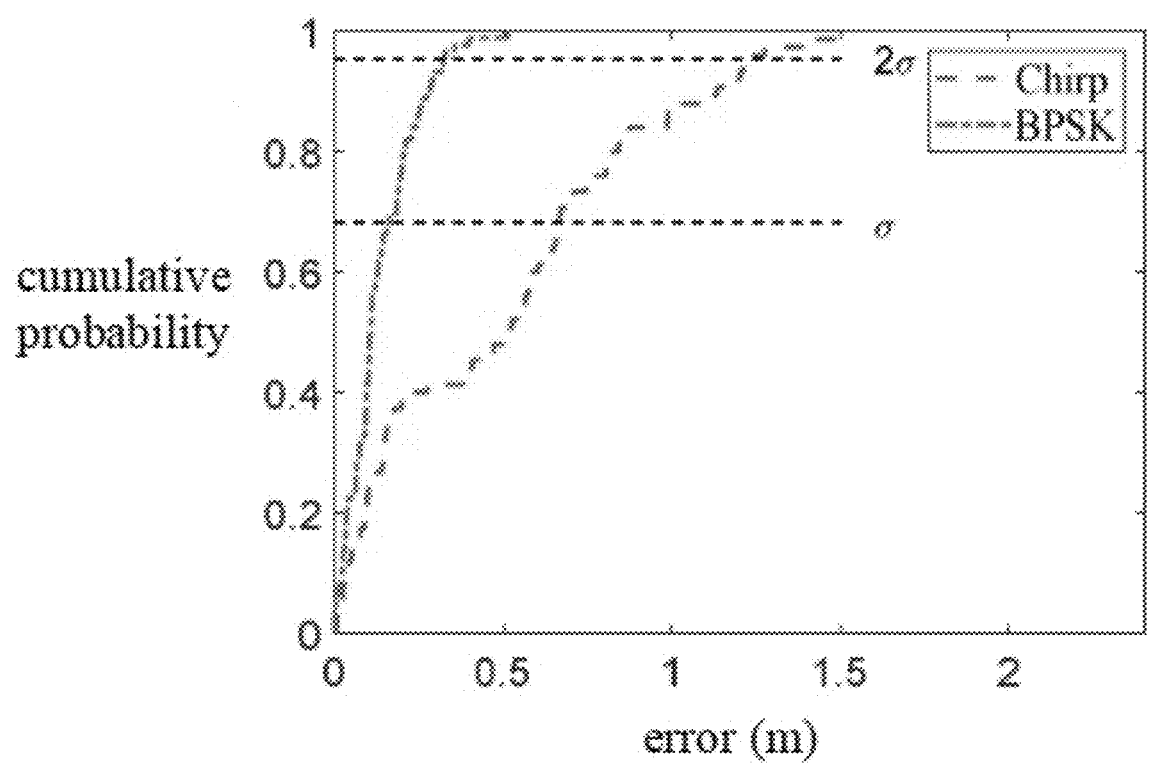
FIG. 9a, FIG. 9b and FIG. 9c are the cumulative distribution function (CDF) of the positioning error of the Chirp signal and the BPSK signal under the three trajectories provided by the embodiment of the invention.
Figure 9B:
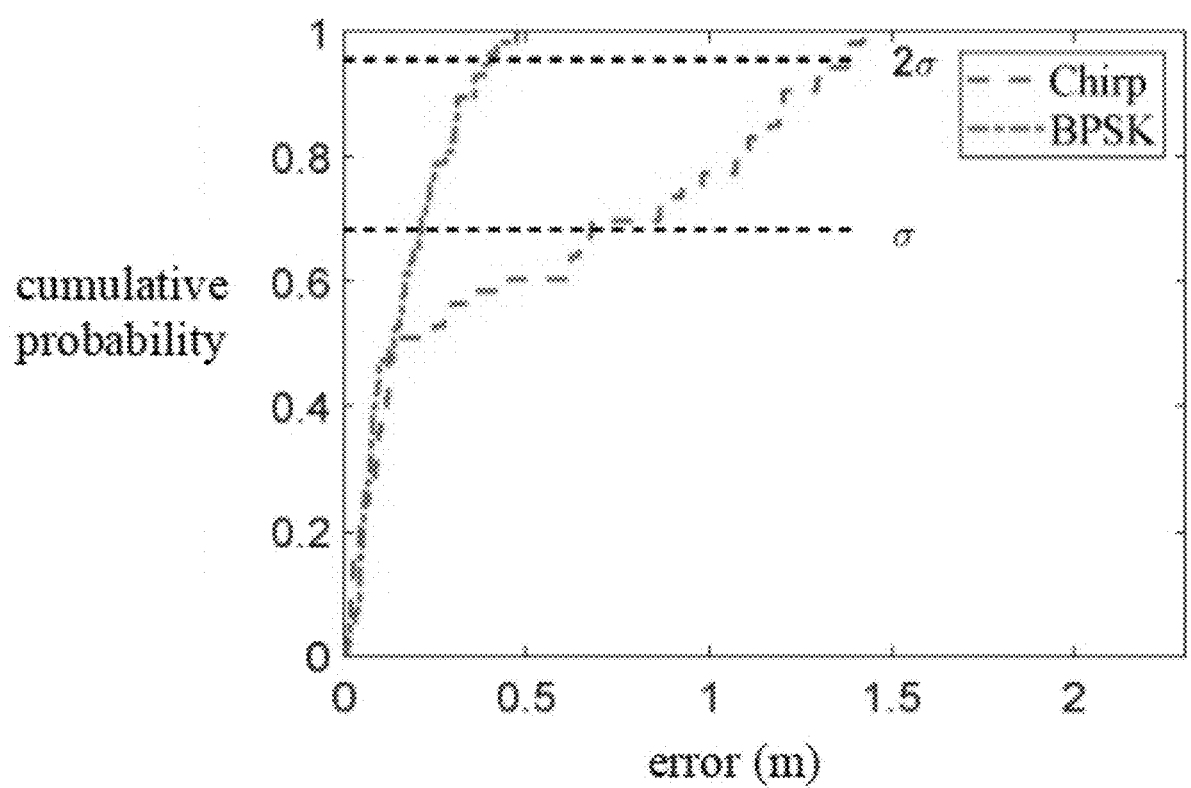
Figure 9C:
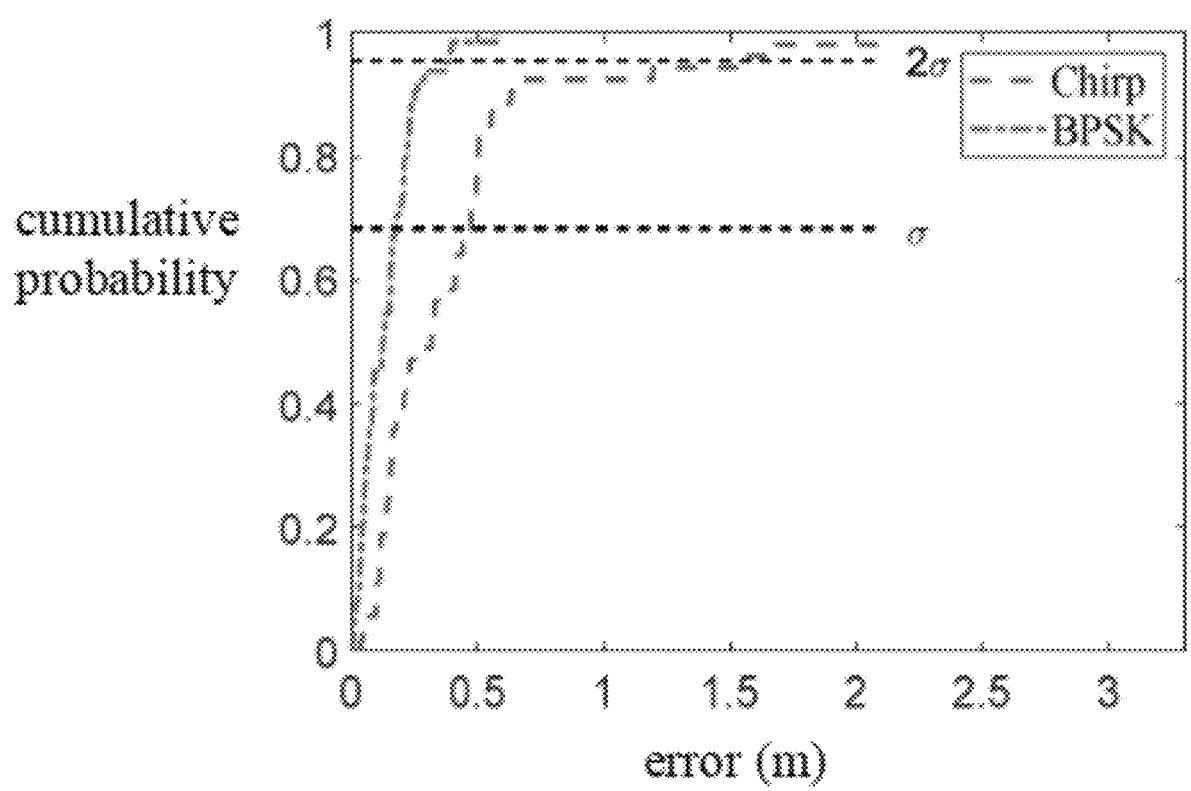

FIG. 9a, FIG. 9c and FIG. 9c show the cumulative distribution function (CDF) of positioning error for chirp signal and BPSK signal under three trajectories. The dotted line is the error of the BPSK signal, and the dashed line is the error of the chirp signal.

TABLE 4

Error static analysis of different positioning algorithms

| | Track a | | Track b | | Track c | |
|---|---|---|---|---|---|---|
| index | Chirp | BPSK | Chirp | BPSK | Chirp | BPSK |
| maximum(m) | 1.516 | 0.514 | 1.421 | 0.472 | 2.123 | 0.576 |
| mean(m) | 0.500 | 0.134 | 0.475 | 0.160 | 0.395 | 0.139 |
| mid-value(m) | 0.514 | 0.108 | 0.139 | 0.137 | 0.318 | 0.125 |
| standard deviation (m) | 0.407 | 0.101 | 0.494 | 0.120 | 0.408 | 0.110 |
| CDF-68%(m) | 0.665 | 0.156 | 0.674 | 0.205 | 0.448 | 0.165 |
| CDF-95%(m) | 1.212 | 0.319 | 1.302 | 0.385 | 1.194 | 0.373 |

It should be noted that embodiments of the present invention may be realized by hardware, software or a combination of software and hardware. The hardware part can be implemented by special logic. The software part can be stored in memory and executed by an appropriate instruction execution system, such as a microprocessor or special design hardware. A person of ordinary skill in the art will understand that the above devices and methods can be implemented using computer executable instructions and/or included in the processor control code, Such code is provided, for example, on a carrier medium such as a disk, CD or DVD-ROM, on a programmable memory such as a read-only memory (firmware), or on a data carrier such as an optical or electronic signal carrier. The device of the present invention and its modules may be implemented by hardware circuits such as very large scale integrated circuits or gate arrays, semiconductors such as logic chips, transistors, etc., or programmable hardware devices such as field programmable gate arrays, programmable logic devices, etc., or by software implemented by various types of processors. It can also be implemented by a combination of the above hardware circuits and software such as firmware.

The above mentioned is only the specific implementation of the invention, but the scope of protection of the invention is not limited to this. Any modification, equivalent replacement and improvement made by any skilled person familiar with the technical field within the scope of the technology disclosed by the invention in the spirit and principle of the invention shall be covered within the scope of protection of the invention.

What is claimed is:

1. A method for acoustic indoor positioning based on code division multiple access (CDMA), which comprises:
generating a binary phase shift keying (BPSK) signal, after mapping a signal number, a code is upsampled to a sampling frequency of a digital-to-analog converter (DAC), and then an up-sampled signal is passed through a shaping filter; Finally, a filtered whole signal is multiplied by a carrier signal to offset a center frequency of the filtered whole signal to a carrier frequency;

detecting the BPSK signal; wherein detecting the BPSK signal comprises: after de-carrier processing, a collected signal is low-pass filtered, and then a filtered data is down-sampled to a design code rate, and then a coarse position of an identification code is determined by a prefix code; Finally, through the coarse position, data with the same length as the identification code is intercepted from the data for matching filtering, and a time of arrival (TOA) of the BPSK signal is obtained; designing four base stations for each area, three time difference of arrival (TDOA) observations generated by four TOA information are obtained, and a terminal position can be obtained through the three TDOA observations; different areas are distinguished by different identification codes to achieve wide area coverage;

detecting the BPSK signal further comprises:

preprocessing the BPSK signal, which comprises:

After an acoustic signal propagates through the air, after time τ, a microphone of the terminal collects a broadcast signal; it can be considered that a collected signal has gone through channel attenuation and is doped with environmental noise, which is denoted as:

$$R(t + \tau) = Hs(t) + n(t + \tau)$$
$$= AHx(t)\cos(2\pi f_c t) + n(t + \tau);$$

wherein, A is an amplitude, $f_c$ is the carrier frequency, x(t) is an actual transmitted signal, and s(t) is an original signal of the base station, n(t) is an environmental noise, H is a channel attenuation amplitude;

the collected signal is multiplied by the carrier signal; a process is called de-carrier and is denoted as:

$$R(t + \tau)\cos(2\pi f_c t) = AHx(t)\cos^2(2\pi f_c t) + n(t + \tau)\cos(2\pi f_c t)$$
$$= \frac{1}{2}AHx(t) + \frac{1}{2}AHx(t)\cos(4\pi f_c t) + n(t + \tau)\cos(2\pi f_c t);$$

a signal part transmitted by a loudspeaker is decomposed from a received signal, and then a result signal part is filtered by a low-pass filter to remove an irrelevant high-frequency information in the signal part, suppress the noise in the environment and an interference of other signals to obtain x(t), which is denoted as:

$$LPF[R(t + \tau)\cos(2\pi f_c t)] = \frac{1}{2}AHx(t);$$

Then, the data is downsampled to compress the signal x(t) from the sampling frequency to a design-time code rate;

confirming the TOA upon arrival:

Because the prefix code is a head of the identification code, a position of the prefix code is found by a simple front-back matching in the time domain, and the coarse position of the identification code is determined;

Through the coarse position, the data with the same length as the identification code is intercepted from the data for matched filtering; before the matched filtering, the frequency offset was processed;

performing Fourier transform on an intercepted signal, and then a transformed signal was converted from a time domain to a frequency domain; at this time, a frequency point where a strength of a frequency domain maximum value is located is the frequency offset of a converted signal; these alternative frequency offsets are de-carriered with the intercepted signal by enumeration, and then matched with a template of the identification code to confirm the TOA of the BPSK signal when it arrives;

wherein, a generated BPSK signal comprises: a design of a signal number composed of a pre-buffer code, a prefix code, an identification (ID) code and a post-buffer code, the identification code is randomly generated by a Gold sequence, the prefix code is a part of a tail of a copy identification code, the pre-buffer code and the post-buffer code are random values of 0 to 1 multiplied by a window function, and the pre-buffer code and the post-buffer code are of an equal length.

2. The method for acoustic indoor positioning based on CDMA according to claim 1, wherein, generating the BPSK signal comprises:

selecting and generating a unique identification code, which is a group of special binary sequences; the identification code itself has good autocorrelation characteristics, and the identification codes have good cross-correlation characteristics; the number of identification codes is increased to support a large area coverage of the base station, and the Gold sequence is selected as the identification code;

copying a tail part of the ID code to a front of the ID code as a prefix, so that the ID code could be roughly located; a width of the prefix code depends on an accuracy of its own rough location;

in order to prevent the speaker of the base station to broadcast, due to a sudden vibration or sudden stop of a low-cost diaphragm caused by frequency leakage, a harsh sound, so before and after the ID code, an increase of equal length buffer code is performed; buffer codes are designed to have random values between 0 and 1 and are multiplied by the window function to avoid the buffer code does not interfere with the identification code, and to make the BPSK signal to slowly start, and to slowly end, to avoid frequency leakage;

mapping the signal number; because $\cos(2\pi f_c t + \pi) = -\cos(2\pi f_c t)$, 0 will be mapped to $-1$, and a rest will remain unchanged after mapping;

up-sampling a mapped code is to the sampling frequency of the DAC;

passing a up-sampled signal through the shaping filter, so that the up-sampled signal had a limited bandwidth and is suitable for a transmission of a channel; a signal with the limited bandwidth is an actual transmitted signal, denoted as x(t); finally, a whole signal is multiplied by the carrier signal $\cos(2\pi f_c t)$, and the center frequency is offset to the carrier frequency; in this way, an original signal s(t) for base station vocalization is obtained, which is expressed as follows:

$$s(t) = Ax(t)\cos(2\pi f_c t);$$

Where, A is the amplitude and $f_c$ is the carrier frequency.

3. A signal generation system for acoustic indoor positioning based on the method according to claim 1, comprising:

a signal generator, used to generate BPSK signals, including a pre-buffer code, a prefix code, an identification code and a post-buffer code;

a mapping unit, used to map and upsample a signal code to the sampling frequency of the DAC;

a filter, used to process a signal through a shaping filter such that the signal has a limited bandwidth;

a carrier modulator, used to shift the center frequency of the signal with the limited bandwidth to the carrier frequency.

4. A signal detection system for acoustic indoor positioning based on the method of according to claim 1, comprising:

a de-carrier processing unit, used to de-carrier an acquired signal;

a low-pass filter, used to low-pass filter a signal after carrier removal;

a sampling rate adjustment unit, used to downsample a filtered data to a design-time code rate;

a matched filter, used to perform matched filtering, thus determining the TOA of the signal.

5. A positioning system for acoustic indoor positioning based on the method according to claim 1, comprising:

multiple base stations, each area has four base stations, used to transmit BPSK signals with specific processing;

a TOA information processing unit, used to obtain TOA information from the received signal;

a TDOA calculation unit, used to generate TDOA observations based on a collected TOA information;

a location calculation unit, used to calculate a location of a terminal from the TDOA observations.

\* \* \* \* \*